Patented Sept. 13, 1932

1,877,426

UNITED STATES PATENT OFFICE

ERIC WILLIAM BOWER OWEN, OF WALMLEY, ENGLAND, ASSIGNOR TO DUNLOP RUBBER COMPANY LIMITED, OF BIRMINGHAM, ENGLAND, A CORPORATION OF GREAT BRITAIN

METHOD FOR MAKING RUBBER ARTICLES

No Drawing. Application filed May 19, 1930, Serial No. 453,869, and in Great Britain May 31, 1929.

My invention relates to the method of and apparatus for making seamless multi-compartment articles or articles having a number of partitions or walls joining in a seamless joint from rubber and similar materials.

An object of my invention is to provide a seamless multi-compartment or multi-walled article of rubber and to provide a process or method of making such an article directly from an aqueous dispersion of rubber or similar material. Other and further objects of the invention are to provide methods and apparatus whereby rubber material may be deposited from an aqueous dispersion and retained on, and in the spaces between, formers or molds and whereby the deposits may be treated on molds or formers and the depositions on the outer and inner walls given different treatment.

In my invention the rubber material of which the seamless article is to be formed is deposited from an aqueous dispersion on formers which are provided with two or more component parts that can be definitely spaced one from another and then brought into close proximity or contact. The spaces between the component parts of the former or mold allow the formation of deposits between the component parts, these deposits being formed in addition to those on the outer periphery or walls of the former to which they join by a seamless joint. When a deposit of rubber material has been formed between the component parts of the formers, the spaces between the latter should be sufficiently small to retain the uncoagulated deposit during subsequent manipulation. The spacings between the component parts of the formers may be temporarily increased before and during the introduction of the former into the dispersions in order to facilitate the rise of such fluid between the component parts.

The aqueous dispersions of rubber material may comprise natural or artificial dispersions of rubber, gutta-percha, balata or similar vegetable resins or artificial dispersions obtained from vulcanized rubber, reclaim, waste or the like or mixtures of any of the said dispersions. These dispersions may be concentrated or concentrated and compounded with any one or more of the usual component ingredients. The dispersions may be prevulcanized if desired.

For example, a mixture of ammonia preserved latex and suitable proportions of zinc oxide, lamp black, whiting and other materials that is stabilized by a colloid such as oleic acid, and concentrated while undergoing a dispersed agitation as described in application, Serial No. 232,705, filed November 11th, 1927, may be used.

When a deposit of the rubber material has been formed on or between the component parts of the molds or formers, the exposed parts of the deposit may be subjected to any suitable and desired treatment. For example, they may be dehydrated by contact with a dehydrating fluid such as acetic acid and salts such as ammonium acetate, sodium chloride and calcium chloride or with a fused low melting salt as described in application, Serial No. 309,353. Or they may be coagulated and swelled concurrently by dipping into a coagulant bath consisting of alcohol or 5% acetic acid solution or a solution of aluminum salt and then dipping into a swelling solution of benzine and alcohol as described in application, Serial No. 393,309. Or the exposed parts of the deposit may be coagulated by the vapors of acetic acid as described in application, Serial No. 406,981 or by a spray of glacial acetic acid as described in application, Serial No. 420,003. The deposit of material may, if desired, be rendered incapable of jelling by sodium hydrofluosilicic acid. Or the exposed parts of the deposit may also be dehydrated and coagulated by evaporation of the dispersed material contained therein.

The unexposed deposits between the component parts of the formers are coagulated by the action of heat in any suitable manner, as for example, as shown in application, Serial No. 393,308, either during or subsequent to the coagulation of the exposed parts of the deposit. The exposed parts of the deposit may also be coagulated by heat as described in copending application, Serial No. 406,982.

The formers on which the deposits are made may be of porous or non-porous character. If non-porous, they may, for example, be of metal, glazed porcelain or glass. If they are of porous material, they may be made of porous porcelain or earthenware. They may, if desired, be porous in some parts and non-porous in others.

The deposits may be subjected to partial or complete drying and to vulcanization either upon the formers or after their removal therefrom.

An example of carrying the invention into effect is as follows:—

The composite former with its component parts sufficiently far apart to allow a mixing to rise easily between them is dipped into a latex mixing of the following compositions:—

Parts by weight (expressed in terms of dry rubber)

| | |
|---|---|
| Rubber latex | 90.9 |
| Sulphur | 2.5 |
| Accelerator | 0.6 |
| Mineral oil | 5.0 |
| Pigment | 1.0 |

The total solids in the above mix are 72% and the alkalinity is 0.15%. To this mix with stirring is added 0.2% (on the total solid content) of sodium silico-fluoride in the form of an emulsion with four times its weight of water.

The former while still in the latex mixing has its component parts adjusted to the desired final spacing, the space being sufficiently small to prevent flow of the uncoagulated deposit, thus retaining the mix between them. The former is then withdrawn from the latex mixing and the exposed parts of the deposit are treated according to any of the methods hereinbefore mentioned, while the unexposed parts are coagulated by the action of heat during or subsequent to the coagulation of the exposed parts of the deposit.

Vulcanization may be brought about during or subsequent to the coagulation of the deposit.

By means of this invention seamless multi-compartment articles such as purses and handbags and linings for such articles may be produced. Multi-compartment tubes can also be reproduced as well as rosettes and other ornaments on articles such as bathing caps. The invention may also be applied for the purpose of obtaining an article for the division of boxes into compartments.

What I claim is:

1. A process of producing seamless multi-compartment articles of rubber material which comprises spacing the component parts of a former, dipping said parts into an aqueous dispersion of rubber-like material to form a deposit thereon and between said component parts and decreasing the space between said component parts.

2. A process as claimed in claim 1 in which the spaces between the component parts of the formers are adjusted while still in the dispersion to the desired final spacing sufficiently small to prevent flow of the uncoagulated deposits.

3. A method of forming multi-compartment articles of rubber material which comprises depositing rubber material from an aqueous dispersion on and between the exposed and closely spaced surfaces of the former and dehydrating the exposed surfaces of said deposit and separately coagulating the deposits between said spaced surfaces with heat.

4. A process of forming multi-compartment articles of rubber material which comprises depositing dispersed rubber material from an aqueous dispersion on and between the spaces and exposed surfaces, and coagulating and swelling the outer surface by successive dipping in a coagulating and swelling solution and separately coagulating the dispersion between the spaces.

5. A method of forming seamless multi-compartment articles of rubber material which comprises placing the component parts of a former in an aqueous dispersion of rubber material while spaced sufficiently to permit the dispersion to enter between said parts, withdrawing said former while spaced sufficiently to retain the rubber dispersion therebetween, and coagulating the dispersion on said former.

6. A seamless multiple compartment article of deposited rubber material having exterior walls and interior compartment dividing walls seamlessly joined to the exterior walls.

In witness whereof, I have hereunto signed my name.

ERIC WILLIAM BOWER OWEN.